US011498759B2

(12) United States Patent
Aljallis et al.

(10) Patent No.: US 11,498,759 B2
(45) Date of Patent: Nov. 15, 2022

(54) SYSTEMS AND METHODS FOR CONNECTING CONTAINERS

(71) Applicant: Walmart Apollo, LLC, Bentonville, AR (US)

(72) Inventors: Elias Aljallis, Howard Beach, NY (US); Vikranth Gopalakrishnan, North Brunswick, NJ (US); Ronald S. Kyslinger, York, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 776 days.

(21) Appl. No.: 16/448,655

(22) Filed: Jun. 21, 2019

(65) Prior Publication Data

US 2020/0002105 A1 Jan. 2, 2020

Related U.S. Application Data

(60) Provisional application No. 62/692,522, filed on Jun. 29, 2018, provisional application No. 62/692,544, (Continued)

(51) Int. Cl.
*B65G 1/06* (2006.01)
*B60P 3/00* (2006.01)
(Continued)

(52) U.S. Cl.
CPC .............. *B65G 1/06* (2013.01); *B25J 5/04* (2013.01); *B60P 3/007* (2013.01); *B61B 3/00* (2013.01);
(Continued)

(58) Field of Classification Search
CPC ......... B65B 43/56; B65B 5/10; B65G 1/0492; B65G 47/90; B65G 65/00; B65G 1/06; B65G 1/0457; B65G 1/1373; G05D 1/0212; G05D 2201/0216; G05B 19/4189; B25J 5/04; B60P 3/007; B61B 3/00; B61B 10/02
See application file for complete search history.

(56) References Cited

U.S. PATENT DOCUMENTS

| | | | |
|---|---|---|---|
| 9,592,759 B1* | 3/2017 | Theobald | B65G 1/0492 |
| 2015/0032252 A1* | 1/2015 | Galluzzo | G05D 1/0248 |
| | | | 700/218 |
| 2017/0174431 A1* | 6/2017 | Borders | B25J 5/007 |

* cited by examiner

*Primary Examiner* — Glenn F Myers
(74) *Attorney, Agent, or Firm* — Morgan, Lewis & Bockius LLP; Manita Rawat

(57) ABSTRACT

A rail can include first and transverse channels defined therein. A container can include a rod, a spring, a first plate assembly, and a second plate assembly. The first plate assembly can include a first transverse bearing disposed in the first transverse channel. The second plate assembly can include a second transverse bearing disposed in the second transverse channel. A robotic assembly can include a robotic arm. The robotic arm can include opposing grips defining a grip space therebetween. A processing system including one or more processors can be configured to, via the robotic assembly: align the grip space with the container rod; drive the rod against the spring; allow the spring to relax and thereby separate the first plate assembly from the second plate assembly; position the rod such that the first transverse bearing and the second transverse bearing are simultaneously withdrawn from the first and second transverse channels.

20 Claims, 17 Drawing Sheets

Related U.S. Application Data filed on Jun. 29, 2018, provisional application No. 62/692,550, filed on Jun. 29, 2018, provisional application No. 62/692,606, filed on Jun. 29, 2018.

(51) Int. Cl.

| | | |
|---|---|---|
| *B65G 1/04* | (2006.01) | |
| *G05D 1/02* | (2020.01) | |
| *B65G 47/90* | (2006.01) | |
| *B65B 5/10* | (2006.01) | |
| *B65B 43/56* | (2006.01) | |
| *B65G 65/00* | (2006.01) | |
| *B25J 5/04* | (2006.01) | |
| *B61B 3/00* | (2006.01) | |
| *B61B 10/02* | (2006.01) | |
| *B65G 1/137* | (2006.01) | |

(52) U.S. Cl.
CPC ............... *B61B 10/02* (2013.01); *B65B 5/10* (2013.01); *B65B 43/56* (2013.01); *B65G 1/0457* (2013.01); *B65G 1/0492* (2013.01); *B65G 47/90* (2013.01); *B65G 65/00* (2013.01); *G05D 1/0212* (2013.01); *B65G 1/1373* (2013.01); *G05D 2201/0216* (2013.01)

SYSTEMS AND METHODS FOR CONNECTING CONTAINERS

CROSS-REFERENCE

This application claims priority to U.S. Provisional Patent Application No. 62/692,522 entitled "Container Filling," U.S. Provisional Patent Application No. 62/692,544 entitled "Container Quick-Release," U.S. Provisional Patent Application No. 62/692,550 entitled "Robotic Container Connection," U.S. Provisional Patent Application No. 62/692,606 entitled "Container Transportation," each filed Jun. 29, 2018 and each of which are hereby incorporated by reference in their entireties.

TECHNICAL FIELD

Among other things, the present application relates to containers connected with rails. A container can be disconnected from a rail with a robotic arm.

BACKGROUND

Warehouses can store many different kinds of items in bins (i.e., longer term storage containers). When a customer places a remote order (e.g., an online order), an employee can load the ordered items from the bins into pockets (i.e., shorter term storage containers). The pockets can be moveably suspended from a rail system. Motors in the rail system can slide (e.g., roll) the pockets along tracks from a loading station to a packing station.

When a pocket arrives at a packing station, an employee can manually remove the pocket and/or the item stored therein. The employee can place the item in a box (e.g., a shipping container). The process can be repeated until the box contains the customer's complete order. The employee can mark the packed box for shipment. A customer's order can include many different items and a warehouse can receive many different simultaneous orders. As a result, the rail system may incorporate thousands of pockets. When pockets are transferred to various locations in the warehouse, an employee may need to manually move the pockets and/or manually remove the pockets from the rail system to another system. Such manual removal can be time-consuming.

SUMMARY

A rail can include first and transverse channels defined therein. A container can include a rod, a spring, a first plate assembly, and a second plate assembly. The first plate assembly can include a first transverse bearing disposed in the first transverse channel. The second plate assembly can include a second transverse bearing disposed in the second transverse channel. A robotic assembly can include a robotic arm. The robotic arm can include opposing grips defining a grip space therebetween.

A processing system including one or more processors can be configured to, via the robotic assembly: align the grip space with the container rod; drive the rod against the spring; allow the spring to relax and thereby separate the first plate assembly from the second plate assembly; position the rod such that the first transverse bearing and the second transverse bearing are simultaneously withdrawn from the first and second transverse channels.

BRIEF DESCRIPTION OF THE FIGURES

The figures show some of the illustrative embodiments disclosed herein. As further explained below, the claimed inventions are not limited to the illustrative embodiments and therefore are not limited to the embodiments shown in the Figures.

For clarity and ease of reading, some Figures omit views of certain features. The relative dimensions shown in the Figures can be aspects of a few illustrative embodiments. Therefore, relative dimensions shown in the Figures can serve as original support. Other illustrative embodiments lack any dimensional relationship to the Figures. The claimed inventions are not limited to any absolute or relative dimensions shown in the Figures unless explicitly stated otherwise.

The present disclosure generally uses the terms "longitudinal", "transverse", and "vertical" to give the reader context when viewing the Figures. Referring to the Figures, depth along the X-axis can be "transverse", depth along the Y-axis can be "longitudinal", and depth along the Z-axis can be "vertical". The X, Y, and Z-axes are consistent across the Figures.

Figure 1:
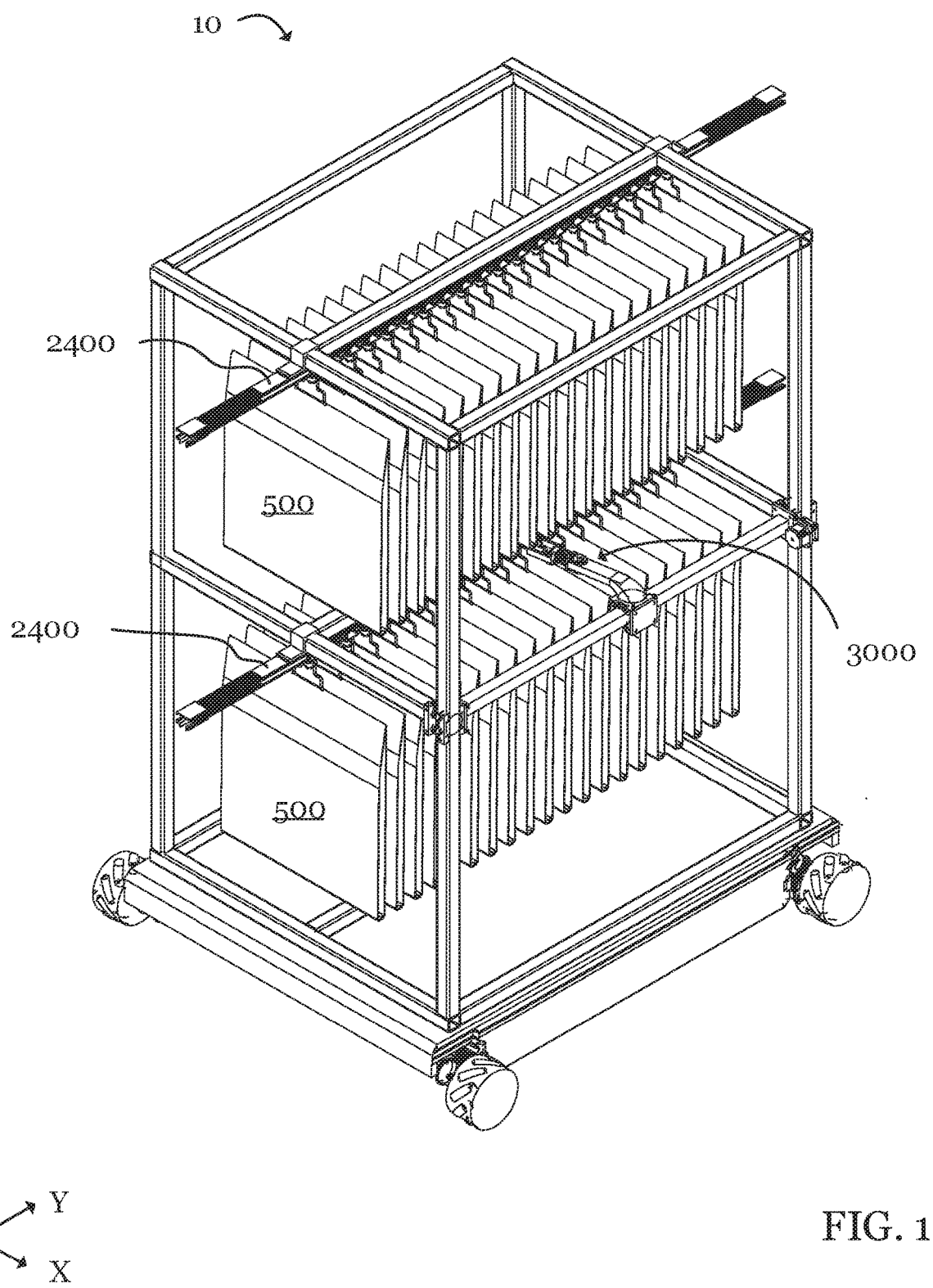

FIG. 1 is an isometric view of a vehicle carrying containers, in accordance with some embodiments.

Figure 2:
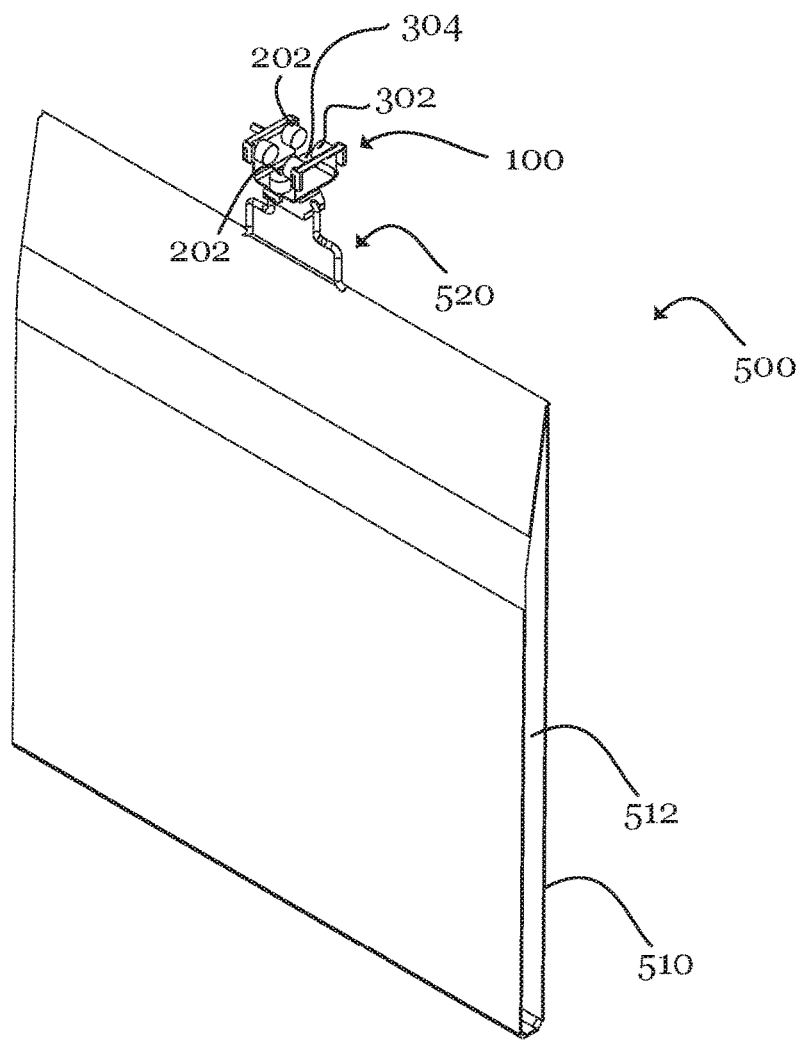

FIG. 2 is an isometric view of a container, in accordance with some embodiments.

Figure 3:
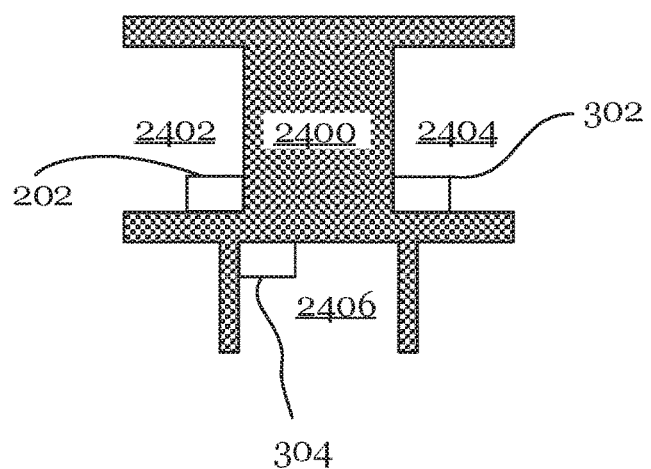

FIG. 3 is a front elevational view of a rail in which bearings of the container are disposed, in accordance with some embodiments. The rail is shown in cross-section.

Figure 4:
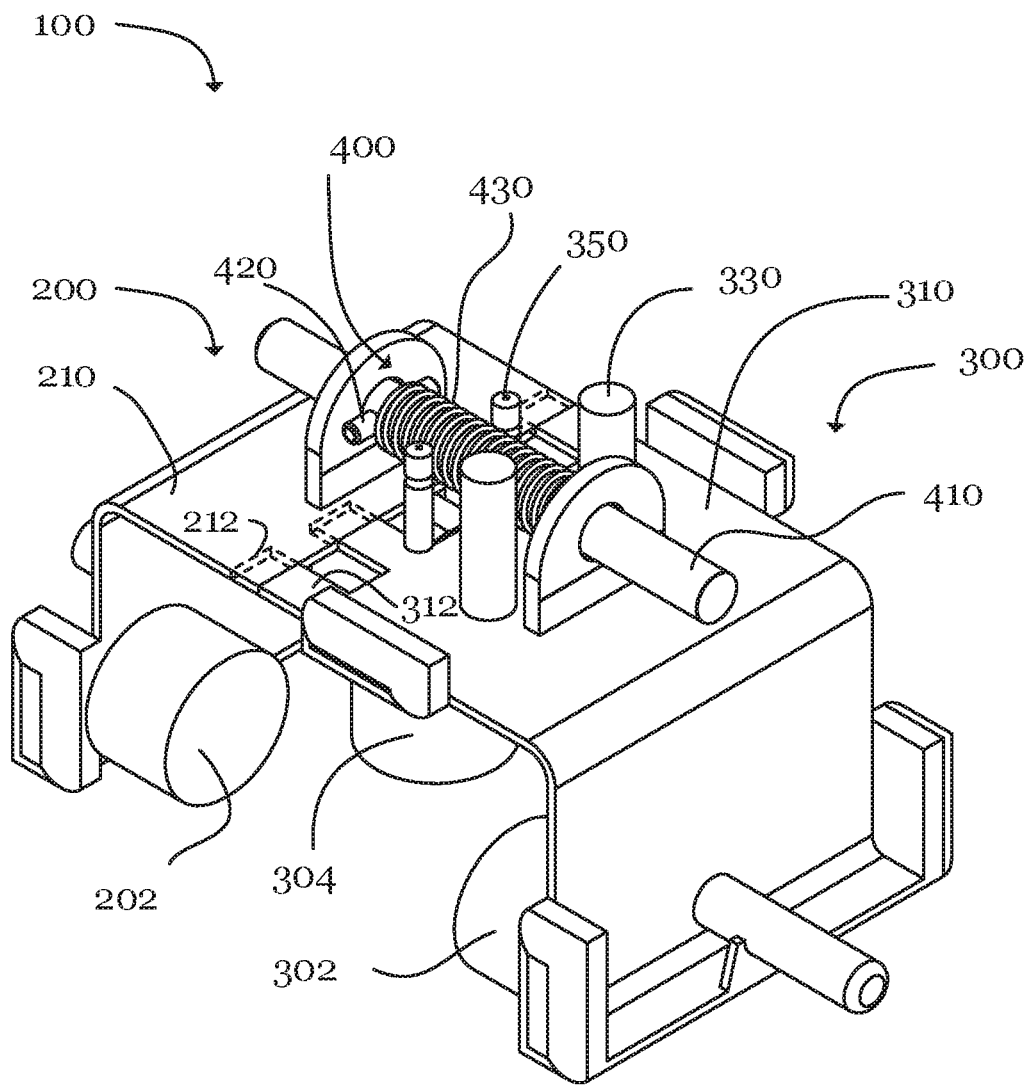

FIG. 4 is an isometric view of a container connection assembly ("CCA") of the container in accordance with some embodiments.

Figure 5:
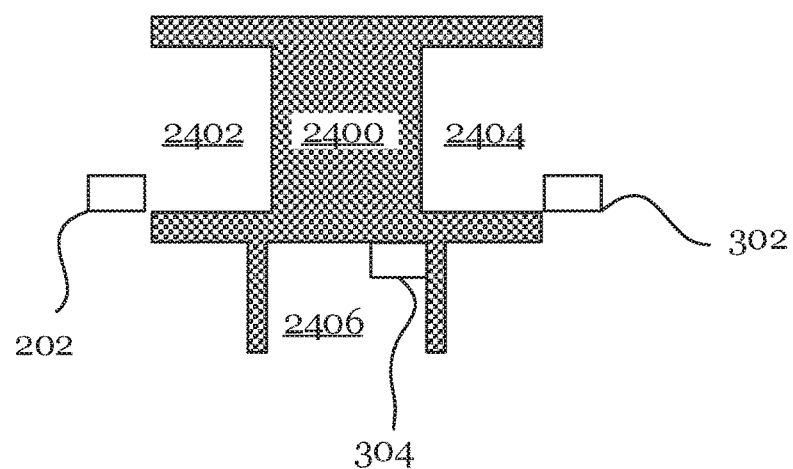
Figure 5:
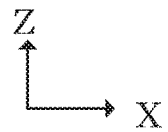

FIG. 5 is a front elevational view of a rail from which bearings of the CCA have withdrawn, in accordance with some embodiments. The rail is shown in cross-section.

Figure 6:
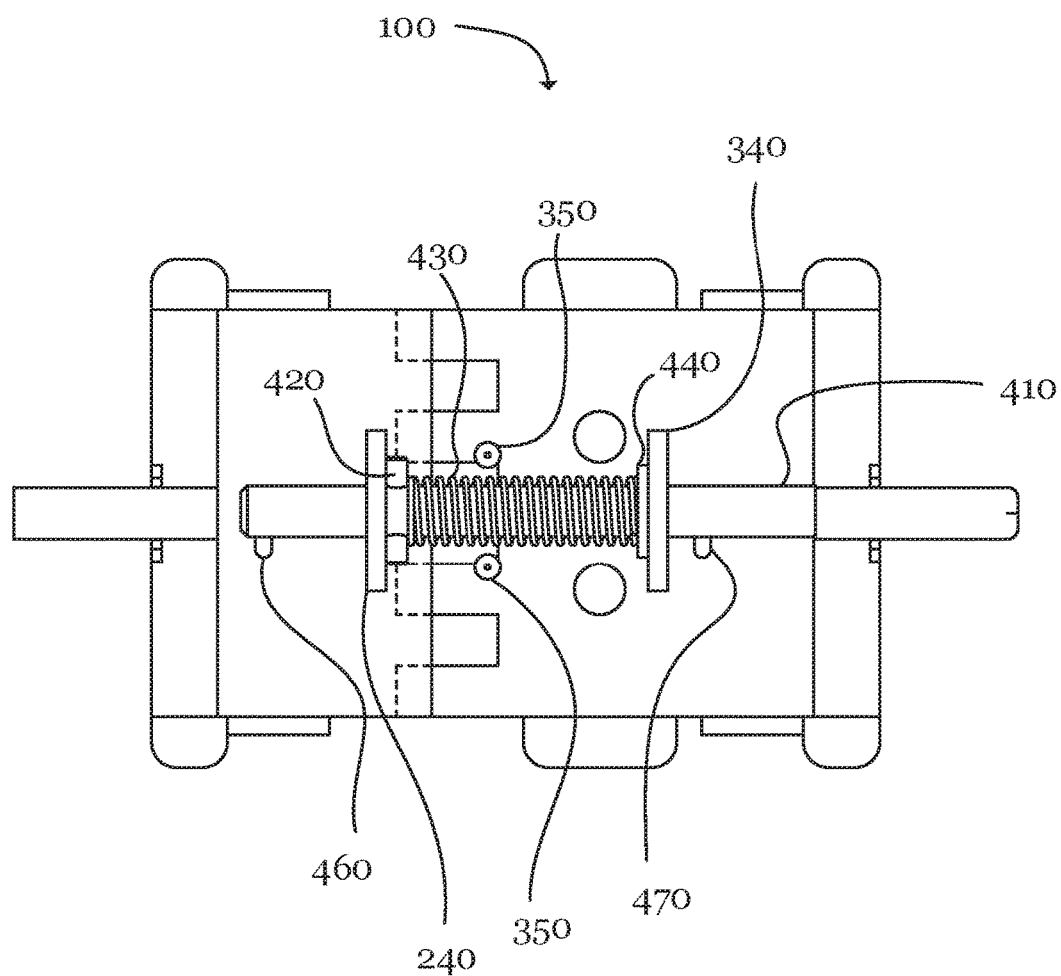
Figure 6:
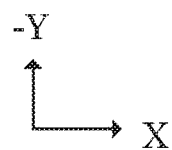

FIG. 6 is a plan view of the CCA, in accordance with some embodiments.

Figure 7A:
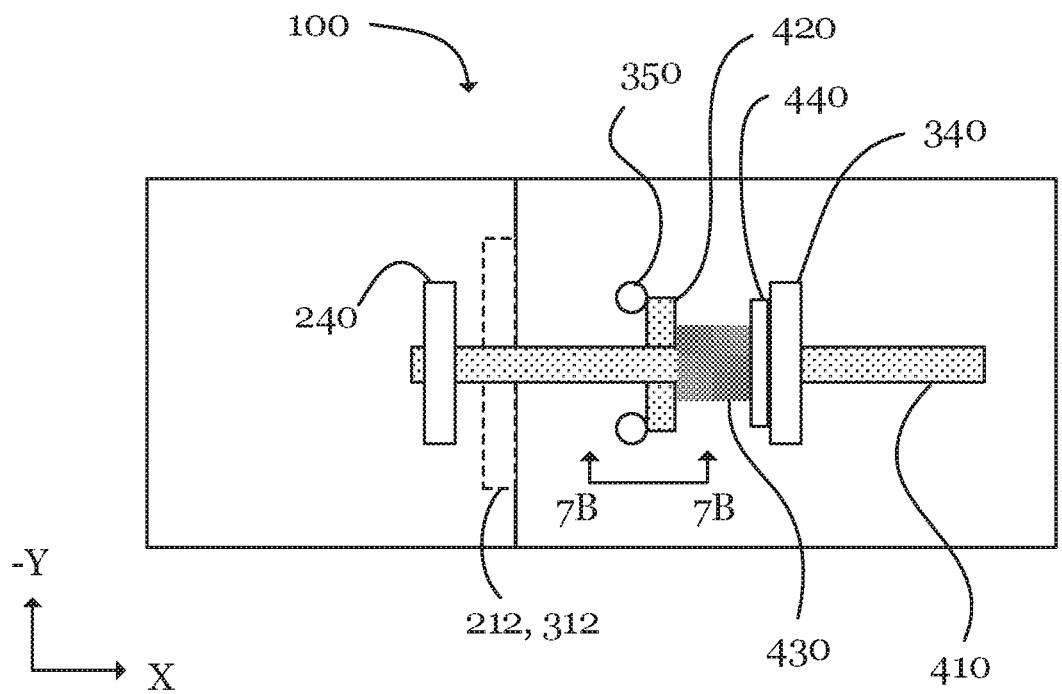
Figure 7B:
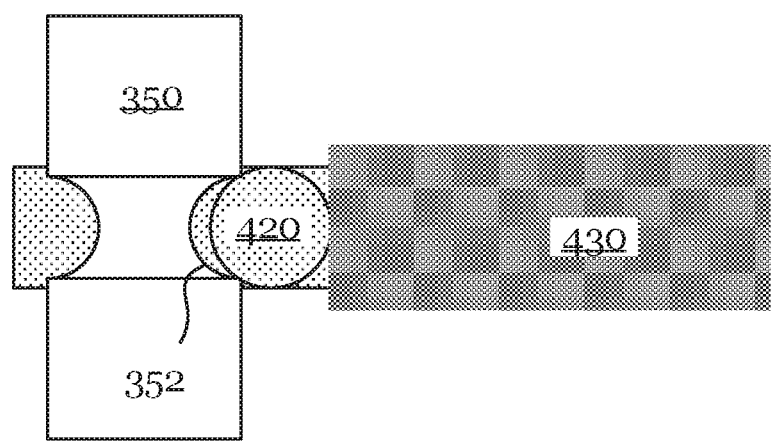

FIGS. 7A-7B are schematic plan views of the CCA, in accordance with some embodiments.

Figure 8:
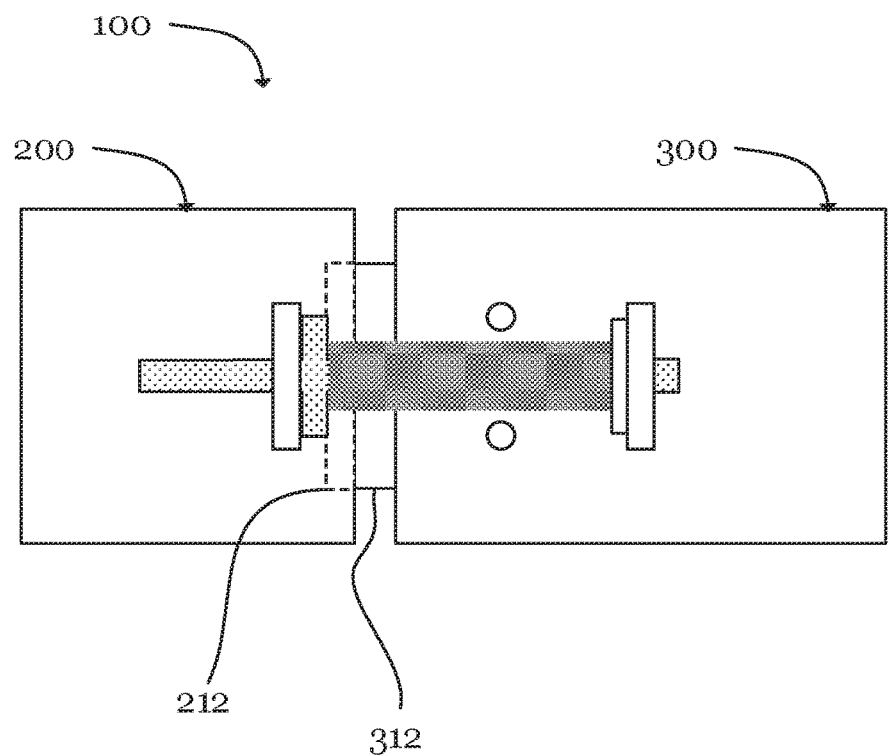

FIG. 8 is a schematic plan view of the CCA, in accordance with some embodiments.

Figure 9A:
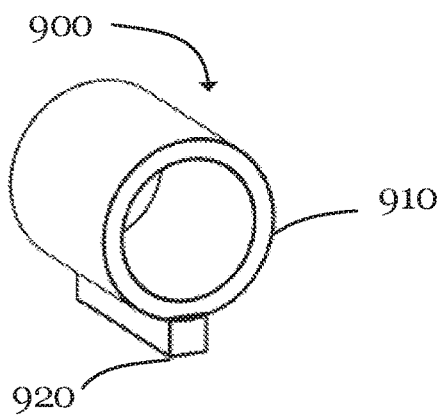
Figure 9B:
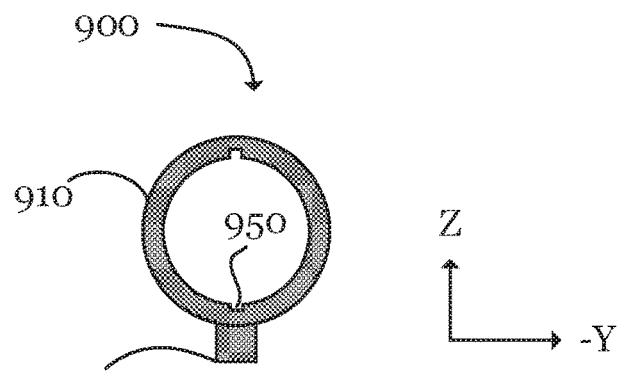
Figure 9C:
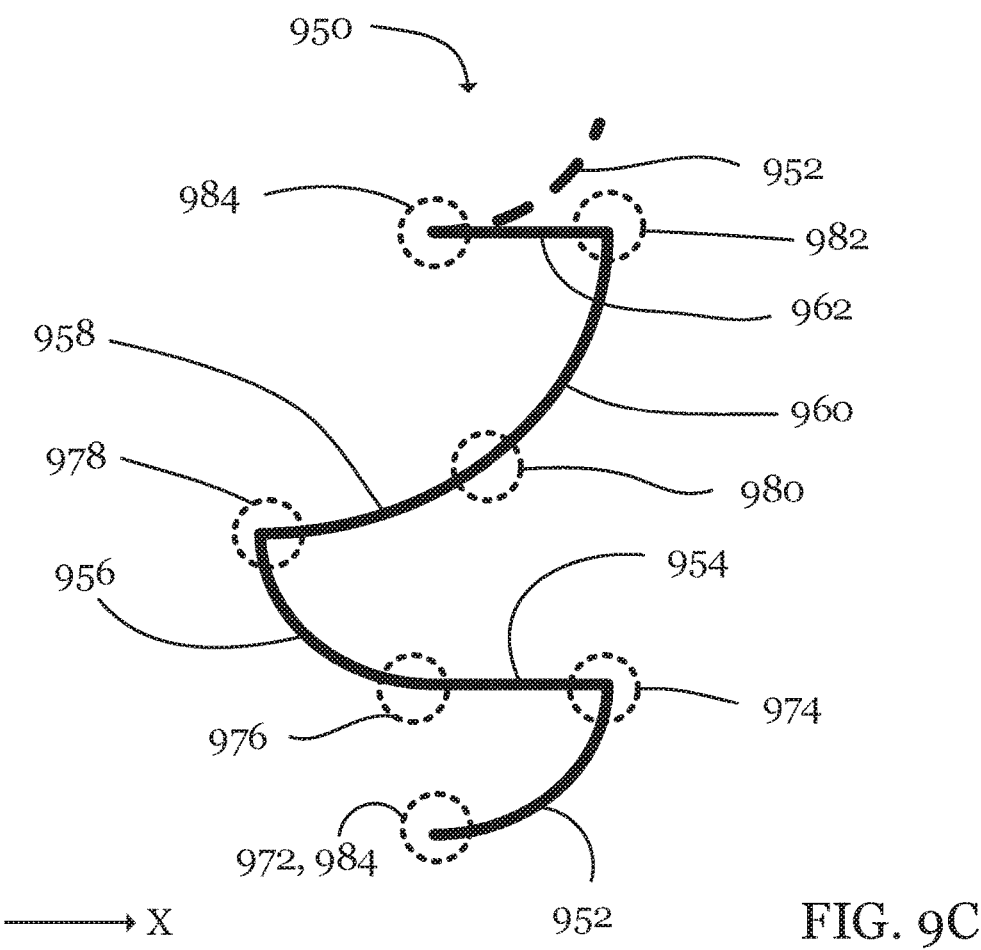

FIG. 9A is an isometric view of a cam, in accordance with some embodiments. FIG. 9B is a cross-sectional and elevational view of the cam, in accordance with some embodiments. FIG. 9C is a view of a track defined within the cam, in accordance with some embodiments.

Figure 10:
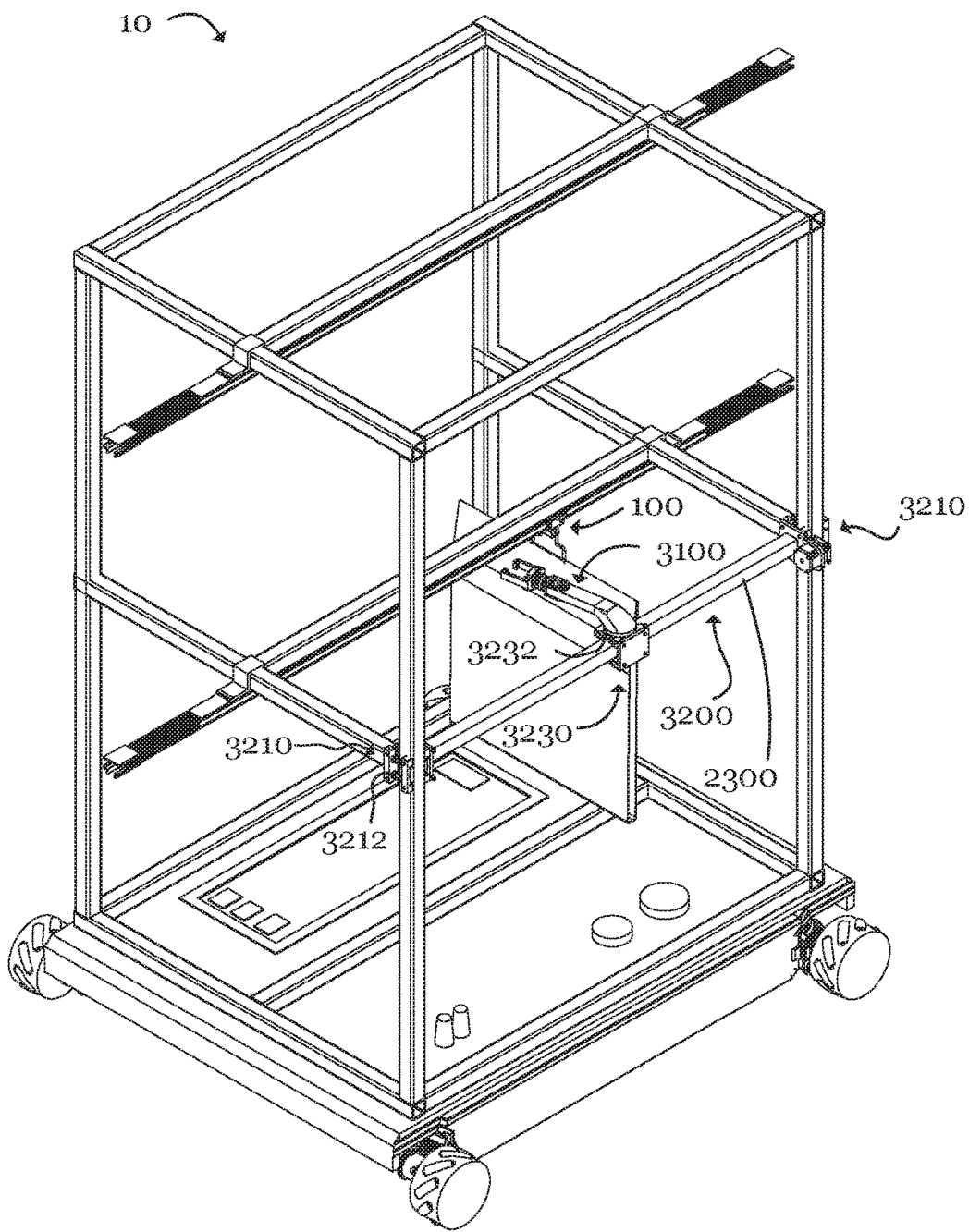
Figure 10:
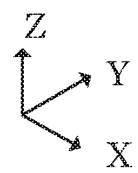

FIG. 10 is an isometric view of the vehicle carrying one container, in accordance with some embodiments.

Figure 11:
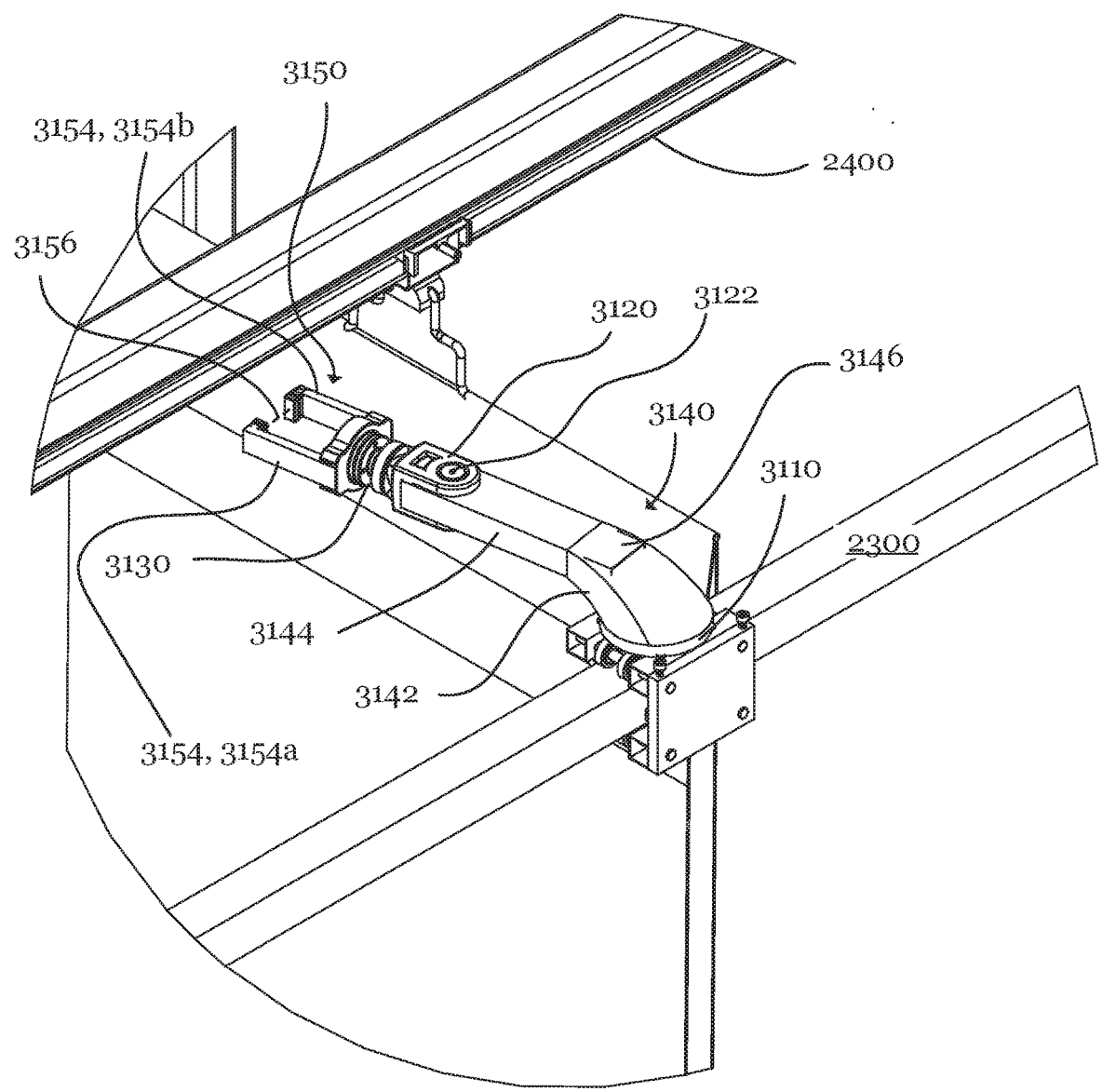

FIG. 11 is an isometric view of a robotic assembly of the vehicle, in accordance with some embodiments.

Figure 12:
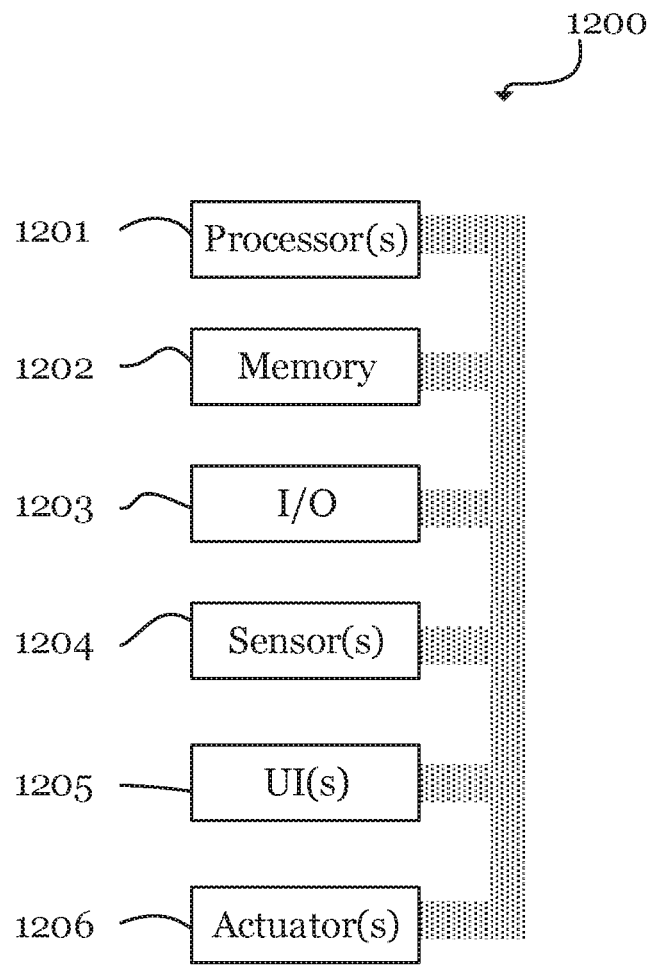

FIG. 12 is a block diagram of a processing system, in accordance with some embodiments.

Figure 13:
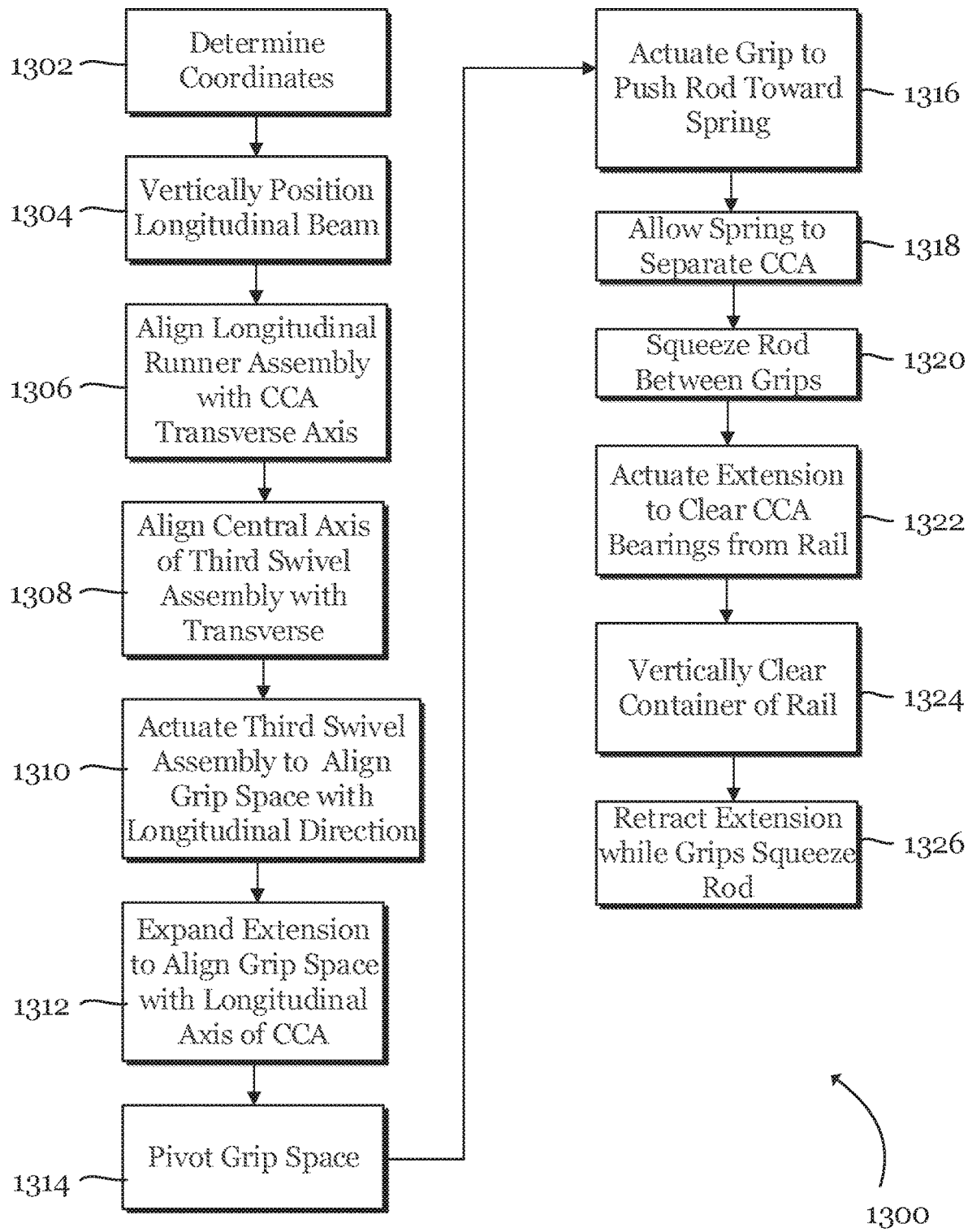

FIG. 13 is a block diagram of a method of decoupling a container from a rail, in accordance with some embodiments.

Figure 14:
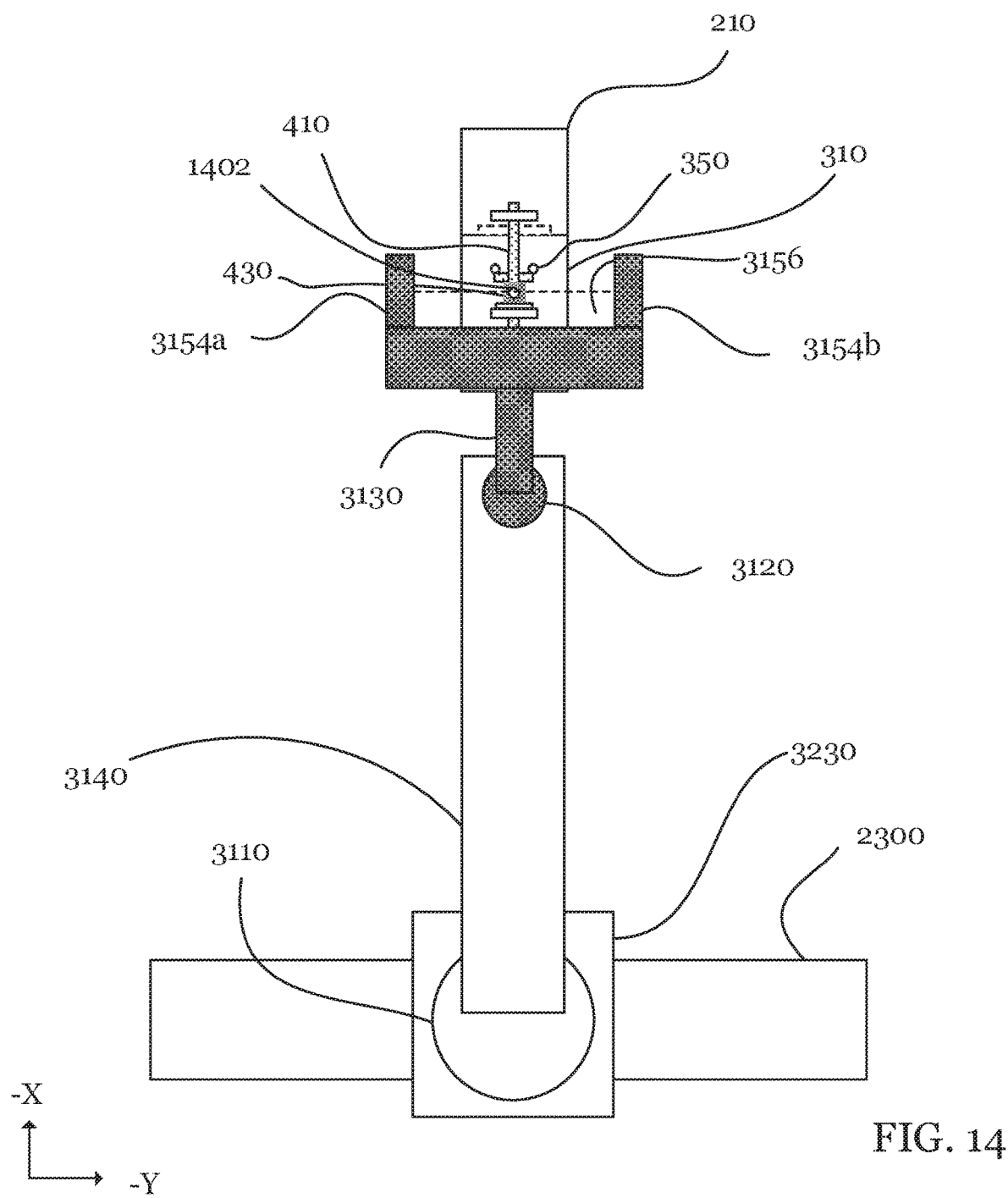

FIG. 14 is a schematic plan view of the robotic assembly positioning about a CCA of a container, in accordance with some embodiments.

Figure 15:
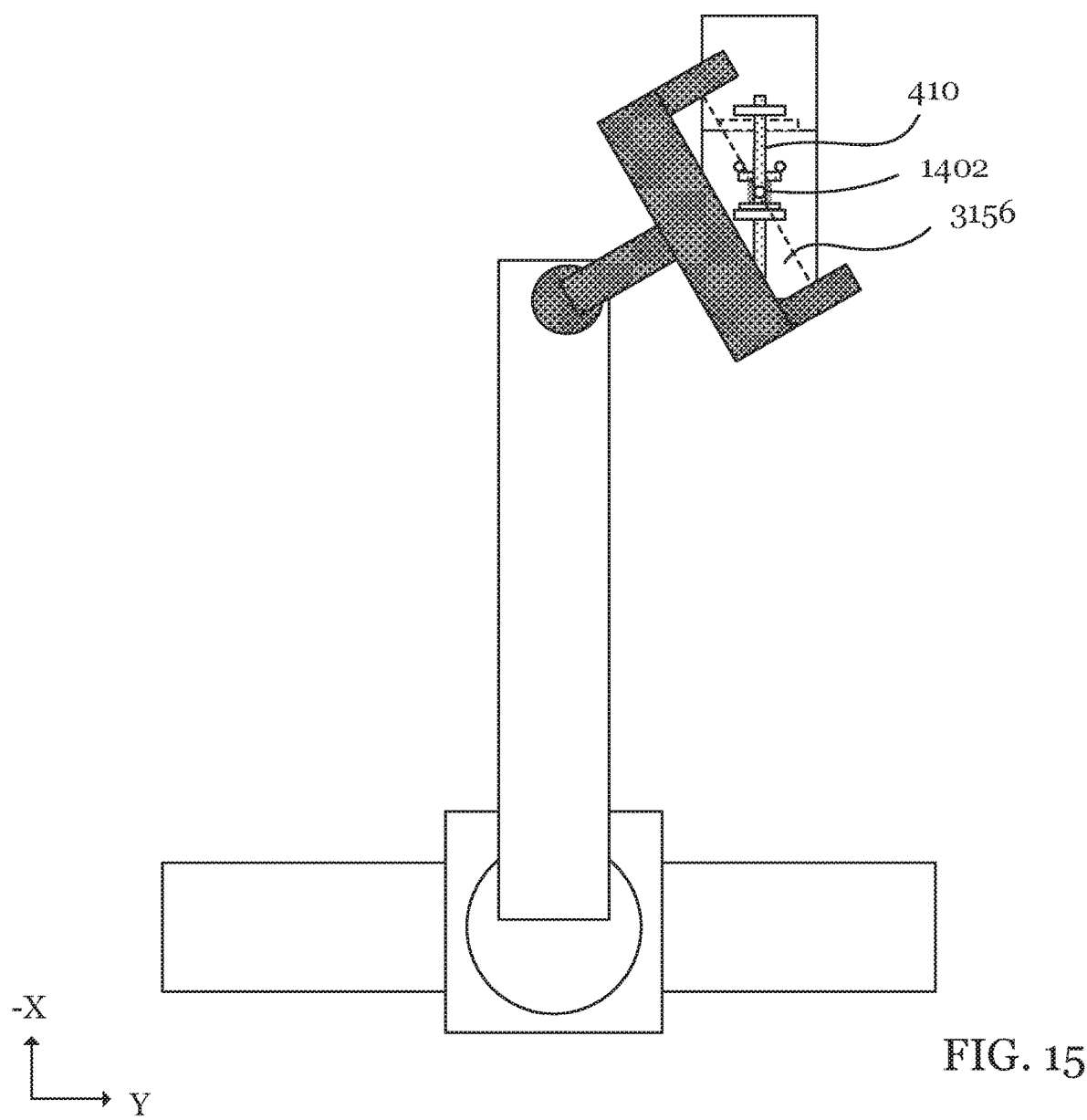

FIG. 15 is a schematic plan view of the robotic assembly positioning about a CCA of a container, in accordance with some embodiments.

Figure 16:
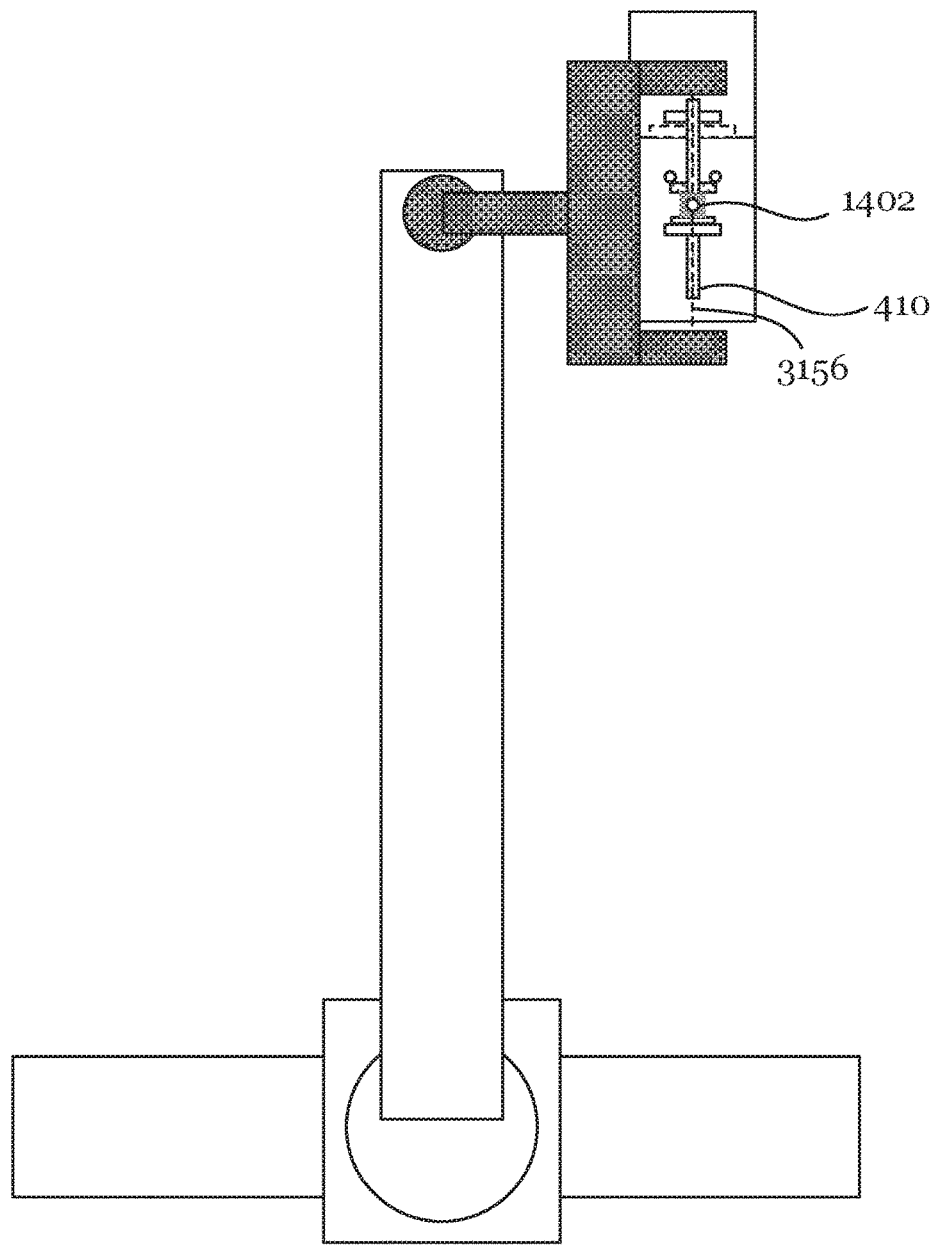

FIG. 16 is a schematic plan view of the robotic assembly positioning about a CCA of a container, in accordance with some embodiments.

Figure 17:
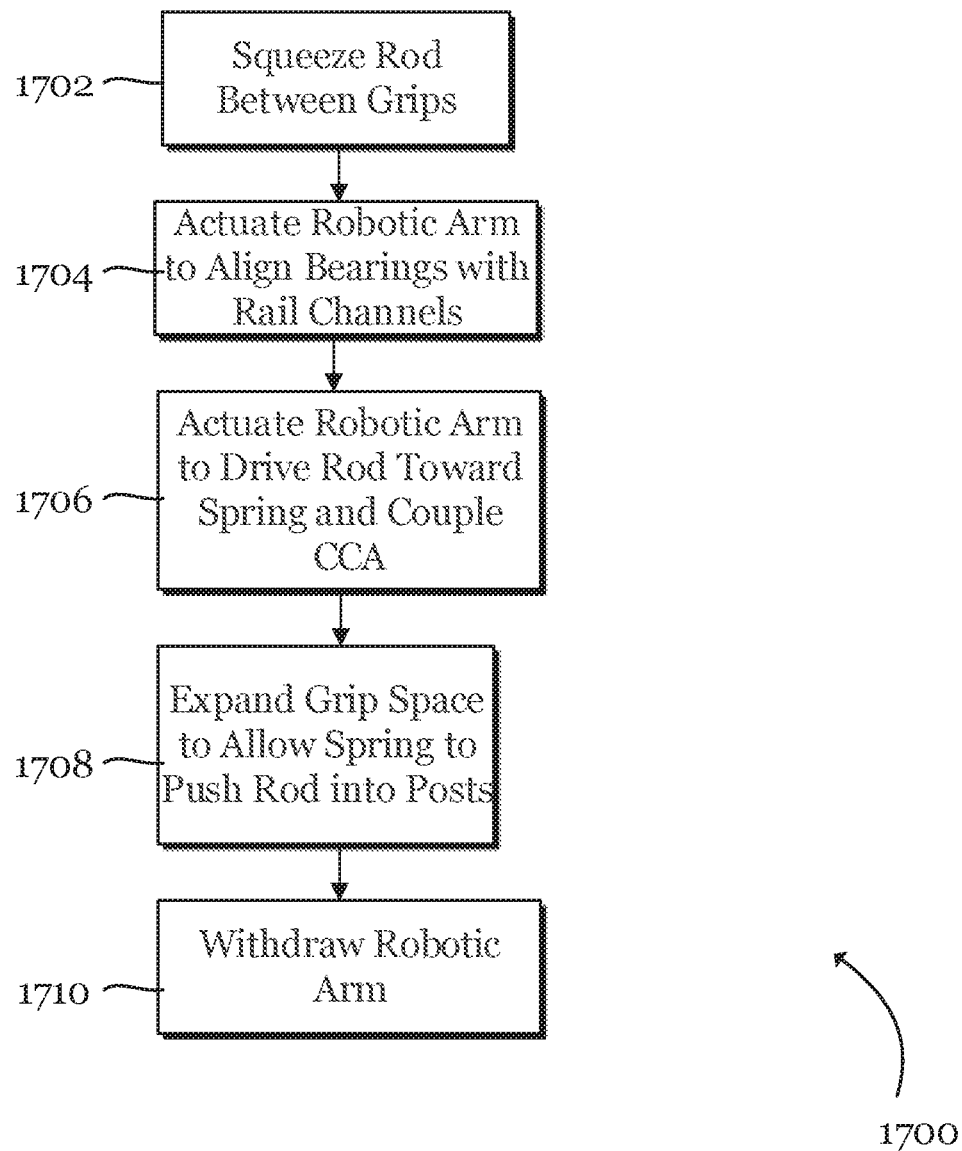

FIG. 17 is a block diagram of a method of decoupling a container with a rail, in accordance with some embodiments.

DETAILED DESCRIPTION

While the features, methods, devices, and systems described herein may be embodied in various forms, there are shown in the drawings, and will hereinafter be described, some illustrative (i.e., example) embodiments. The claimed inventions are not limited to the illustrative embodiments. Therefore, some implementations of the claimed inventions will have different features than those set out in this disclosure.

Further, implementations of the claimed inventions can make changes with respect to the claims without departing from the spirit or scope of the application. Therefore, the claimed inventions are intended to embrace their full-range of equivalents.

Unless otherwise indicated, any directions reflect the orientations of the components shown in the corresponding drawings and do not limit the scope of the present disclosure. Any absolute term (e.g., large, small) can be replaced with a corresponding relative term (e.g., larger, smaller).

FIG. 1 shows an exemplary embodiment of a vehicle 10. Vehicle 10 can include a base 1000, a rack 2000, and a robotic assembly 3000. Rack 2000 can include rails 2400. Rails 2400 can slideably support containers 500. Robotic assembly 3000 can be configured to connect containers 500 with, and disconnect containers 500 from, rails 2400. The example of vehicle 10 is used, but the rack 2000, rails 2400, and containers 500 can be used without a vehicle. For example, rails 2400 can be permanently fixed to static structure (e.g., suspended from the ceiling of a warehouse).

FIG. 2 shows a container 500. Container 500 can include a vessel 510, a linkage assembly 520, and a container connection assembly ("CCA") 100. Vessel 510 (also called a container body) can an inner chamber 512 for receiving an item (not shown). Linkage assembly 520 can include one or more rods extending between vessel 510 and CCA 100. CCA 100 can slideably couple container 500 with rail 2400.

More specifically, CCA 100 can include bearings (i.e., bearing assemblies) 202, 302, 304 can be mounted to CCA. As shown schematically in FIG. 3, bearings 202, 302, 304 can be respectively mounted in longitudinally extending channels 2402, 2404, 2406 defined by rail 2400. FIG. 3 shows rail 2400 in cross-section. Stippling indicates inner material.

Referring to FIG. 4, CCA 100 can include a first transverse plate assembly 200, a second transverse plate assembly 300, and a release assembly 400. Note that CCA 100 has a different orientation in FIG. 4 than in FIGS. 1-3. CCA 100 can occupy a plurality of different separation states, which are discussed below. In FIG. 4, CCA 100 is in a separated state.

First plate assembly 200 can include a first base 210, which can mount first transverse bearings 202. Second plate assembly 300 can include a second base 310, which can mount second transverse bearings 302 and vertical bearings 304. As previously discussed with reference to FIG. 3, bearings 202, 302, 304 can be for longitudinal motion along rail 2400. As shown in FIG. 3, bearings 202, 302, 304 can further retain container 500 on rail 2400. First transverse bearings 202 can discourage vertical movement and positive transverse movement. Second transverse bearings 302 can discourage vertical movement and positive transverse movement. Vertical bearings 304 can discourage positive vertical movement.

Referring to FIG. 4, first base 210 can include one or more first retainers 212 and second base 310 can include one or more second retainers 312. In FIG. 4, first retainers 212 are shown as pockets and second retainers 312 are shown as fingers for being receiving in the pockets. Although not shown, first and second retainers 212, 312 can include locking features (e.g., snap retention features) such that upon insertion, first and second retainers 212, 312 are bound together by a locking force.

During use, it may be desirable to decouple first plate assembly 200 from second plate assembly 300. As shown schematically in FIG. 5, when CCA 100 is in a fully decoupled state, enough transverse clearance can be defined between first and second bases 210, 310 to withdraw bearings 202, 302, 304 from rail channels 2402, 2404, 2406.

Release assembly 400 can be configured to overcome the locking force of retainers 212, 312 to transversely separate first plate assembly 210 from second plate assembly 310. Referring to FIGS. 4 and 6, release assembly 400 can include a rod 410, a spring 430, and a washer 440. First plate assembly 200 can include a first stopping plate 240 (also called a "first stop"). Second plate assembly 300 can include a second stopping plate (also called a "second stop") and posts 350 defining outer circumferential grooves 352 (also called ring grooves).

Rod 410 can include first opposing cylindrical arms 420 (FIG. 2), and one or more pins 460, 470 (arms and pins are also called outward extensions). Spring 430 can be compressed between washer 440 and first arms 420 (FIG. 6). Spring 430 can wrap about rod 410 (FIG. 2).

FIGS. 7A and 7B schematically show CCA 100 in an unseparated state. The stippling is used to differentiate between components and does not indicate cross-section. Referring to FIG. 7B, first arms 420 can be stably seated within ring grooves 352 of posts 350. Spring 430 can exert opposing transverse forces on both posts 350 and second stop 340. Because posts 350 and second stop 340 are both fixed to second base 310, the opposing transverse forces can cancel. As such, the locking force applied by retainers 212, 312 can keep first and second plate assemblies 200, 300 fully coupled and bearings 202, 302, 304 seated within rail channels 2402, 2404, 2406 (FIG. 3).

FIG. 8 schematically shows CCA 100 in a fully separated. Spring 430 has pressed washer 440 against second stop 340 and arms 420 against first stop 240. The outward transverse forces of spring 430 have overcome the locking force applied by retainers 212, 312. As a result, first base 210 has transversely separated from second base 310 and bearings 202, 302, 304 are withdrawable from rail channels 2402, 2404, 2406 (FIG. 5). Note that spring 430 can remain compressed in the fully decoupled state since a cam 900 (discussed below), can limit the maximum amount of transverse separation.

Referring to FIGS. 9A-9C, first and/or second plate assembly 200, 300 can include a cam 900. Cam 900 can be for controlling the transverse motion of rod 410 and for controlling the rotation of rod 410. Cam 900 can be mounted to first base 210 and thus interact with pin 460 or mounted to second base 310 and thus interact with pin 470. First base 210 and pin 460 are used as an example.

Referring to FIG. 9A, cam 900 can include a hollow cylinder 910 and a cam base 920. Base 920 can be for mounting cam 900 to first base 910. Rod 410 can extend through the central axis of cylinder 910. Grooves in cylinder 910 are not shown in FIG. 9A. FIG. 9B is a cross section through cam cylinder 910 and grooves 950. As shown in FIG. 9B, grooves 950 can exist on the inner surface area of cam base 920.

FIG. 9C is a flattened illustration of grooves 950. Grooves 950 can include an arced first segment 952, a transverse and linear second segment 954, an arced third segment 956, an arced fourth segment 958, an arced fifth segment 960, and a transverse and linear sixth segment 962. FIG. 9C shows a complete cycle of cam 900 such that points 972 and 984 represent identical positions.

At point 972, CCA 100 can be in a first state where CCA 100 is fully coupled (FIG. 7A). A user (e.g., a robotic arm) can push rod 410 in the positive transverse direction, causing pin 460 to reach point 974. At point 974, CCA 100 can remain fully coupled, but rod 410 can be rotated 90 degrees such that arms 420 are oriented along the vertical axis.

After point 974, the user can release rod 410. Spring 430 can push rod 410 along second and third groove segments 954, 956. At point 976 arms 420 can be vertically oriented (to clear posts 350). Between points 976 and 978, arms 420 can contact first stop 420, spring 430 can overcome the locking force of retainers 212, 312, and CCA 100 can begin to separate.

CCA 100 can separate until pin 460 reaches point 978. At point 978, arms 420 can be longitudinally oriented. At point 978, enough transverse separation can be defined between transverse bearings 202, 302 to remove container 500 rail 2400 (FIG. 5). Spring 430 can remain compressed.

First, second, and third groove segments 952, 954, 956 can define a decoupling cycle where release assembly 400 separates CCA 100 until CCA 100 is removeable from rail 2400. Fourth, fifth, and sixth groove segments 958, 960, 962 can be for recoupling CCA 100 with rail 2400.

Pin 460 can begin at point 978. The user can push rod 410 toward spring 430, causing pin 460 to follow fourth groove segment 958. At point 980, arms 420 can be vertically oriented to clear posts 350. The user can continue pushing rod 410 toward spring 530 pin 460 reaches point 982, where arms 420 can be longitudinally oriented.

After pin 460 reaches point 982, the user can release rod 410, causing spring 430 to push pin 460 from point 982 to point 984. At point 984, arms 420 can remain longitudinally oriented and therefore contact posts 350. A hitch (not shown) can be defined at point 984 to cause pin 960 to follow first groove segment 952 of the next cycle (shown in broken lines), instead of proceeding backwards along sixth segment 962. Point 984 can be the same as point 972 such that proceeding from point 972 to point 984 represents a complete revolution of rod 410 within cam 900.

Referring to FIG. 10, robotic assembly 3000 can include a robotic arm 3100 and a robotic beam 3200. Robotic beam 3200 can be for vertically positioning robotic arm 3100. Robotic arm 3100 can remove containers 500 from rail 2400 (e.g., by actuating release assembly 400). Robotic arm 3100 can add containers 500 to rail 2400 (e.g., by actuating release assembly 400).

Robotic beam 3200 can include a longitudinal beam 2300 directly coupled to vertical beams 2100 via vertical runner assemblies 3210. Each vertical runner assembly 3210 can include bearings (i.e., wheels) 3212, brake pads (not shown), and motors (not shown) for actuating both. The motors can cause bearings 3212 to vertically slide vertical runner assembly 3210 (and thus longitudinal beam 2300) up and down vertical beam 2100. Upon reaching a desired vertical position, the motors can actuate the brakes to lock longitudinal beam 2300 in a desired vertical position.

Robotic beam 3200 can include a longitudinal runner assembly 3230. Longitudinal assembly 3230 can be configured for longitudinal motion along longitudinal beam 2300. Longitudinal runner assembly 3230 can be similar to vertical runner assemblies 3210, except oriented for longitudinal motion instead of vertical motion. Longitudinal runner assembly 3230 can include bearings 3232 (i.e., wheels), brakes (not shown), and motors. The motors can drive bearings 3232 along longitudinal beam 2300. The motors can actuate the brakes to lock longitudinal runner assembly 3230 in position.

Robotic arm 3100 can be directly mounted on longitudinal runner assembly 3230. Referring to FIG. ii, which is a zoomed view of FIG. 10, robotic arm can include a first swivel assembly 3110, an extension 3140, a second swivel assembly 3120, a third swivel assembly 3130, and a pincer (also called claw) assembly 3150.

First swivel assembly 3110 can be configured to rotate extension 3140 about the vertical axis. Extension 3140 can include a base 3142 and a box-shaped beam 3144. Base 3142 can define a housing 3146 for accommodating a portion of beam 3144 when in the retracted position. Base 3142 can include motors for extending beam 3144 from housing 3146 and thus increasing the effective span of robotic arm 3100 (i.e., increasing the distance between pincer assembly 3150 and extension base 3142).

Second swivel assembly 3120 can be rotatable about the vertical axis via pin 3122. Second swivel assembly 3120 can include motors (not shown) for driving rotation about the vertical axis. Third swivel assembly 3130 can be rotatable about its central axis (which is shown in FIGS. 10 and 11 as being slightly offset from transverse). Third swivel assembly 3130 can include one or more motors (not shown) for driving rotation about the central axis.

Pincer assembly 3150 (also called a grip assembly) can be directly mounted to third swivel assembly 3130 and rotatable therewith. Pincer assembly 3150 can include a pair of grips 3154, 3154a, 3154b. One or both of grips 3154 can be configured to move inwards and outwards (along a line perpendicular to the central axis of third swivel assembly 3130). Pincer assembly 3150 can include motors (not shown) for driving grips 3154 inwards and outwards to respectively decrease and increase the space 3156 defined between opposing grips 3154.

Referring to FIG. 12, vehicle 100 can include a processing system 1200. Processing system 1200 can include one or more processors 1201, memory 1202, one or more input/output devices 12012, one or more sensors 1204, one or more user interfaces 1205, and one or more actuators 1206.

Processors 1201 can include one or more distinct processors, each having one or more cores. Each of the distinct processors can have the same or different structure. Processors 1201 can include one or more central processing units (CPUs), one or more graphics processing units (GPUs), circuitry (e.g., application specific integrated circuits (ASICs)), digital signal processors (DSPs), and the like. Processors 1201 can be mounted on a common substrate or to different substrates.

Processors 1201 are configured to perform a certain function, method, or operation at least when one of the one or more of the distinct processors is capable of executing code, stored on memory 1202 embodying the function, method, or operation. Processors 1201 can be configured to perform any and all functions, methods, and operations disclosed herein.

For example, when the present disclosure states that processing 1200 performs/can perform task "X" (e.g., task "X is performed"), such a statement should be understood to disclose that processing system 1200 can be configured to perform task "X". Vehicle 10 and processing system 1200 are configured to perform a function, method, or operation at least when processors 1201 are configured to do the same. As used herein the term "determine", when used in conjunction with processing system 1200 can mean detecting, receiving, looking-up, computing, and the like.

Memory 1202 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 1202 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 1202.

Input-output devices 12012 can include any component for trafficking data such as ports, antennas (i.e., transceivers), printed conductive paths, and the like. Input-output devices 12012 can enable wired communication via USB®, DisplayPort®, HDMI®, Ethernet, and the like. Input-output devices 12012 can enable electronic, optical, magnetic, and holographic, communication with suitable memory 12012. Input-output devices 12012 can enable wireless communication via WiFi®, Bluetooth®, cellular (e.g., LTE®, CDMA®, GSM®, WiMax®, NFC®), GPS, and the like. Input-output devices 12012 can include wired and/or wireless communication pathways.

Sensors 1204 can capture physical measurements of environment and report the same to processors 1201. Examples of sensors 1204 include temperature sensors, image sensors, LiDAR sensors, etc. Processing system 1200 can rely on sensors 1204 when automatically positioning robotic assembly 3000 according to the methods discussed herein. User interface 1205 can include a display (e.g., LED touchscreens (e.g., OLED touchscreens), physical buttons, speakers, microphones, keyboards, and the like. Actuators 1206 can enable processors 1201 to control mechanical forces. Actuators 1206 can include motors, brakes, hydraulics, etc.

Processing system 1200 can be distributed (e.g., primary non-volatile memory can be disposed in a first remote server and the other modules can be disposed in a second remote server). Processing system 1200 can have a modular design where certain modules have a plurality of the features shown in FIG. 12. For example, one module can include one or more processors 1201, memory 1202, I/O 12012, and sensors 1204.

Referring to FIG. 13, processing system ("PS") 1200 can be configured to perform a method 1300. Method 1300 can be for removing a container 500 from rail 2400. At block 1302, PS 1200 can determine vertical and longitudinal coordinates of a CCA 100 of a desired container 500.

Blocks 1304-1312 can result in robotic arm 3100 attaining the geometry with respect to CCA 100 schematically shown in FIG. 14 (discussed below). At block 1304, PS 1200 can position longitudinal beam 2300 at a vertical position below the rail 2400 to which container 500 is coupled such that the central axis of third swivel assembly 3130 is coplanar with the central axis of rod 410. At block 1306, PS 1200 can align longitudinal runner assembly 3230 with the central transverse axis of CCA 100. At block 1308, PS 1200 can actuate first swivel assembly 3110 and second swivel assembly 3120 to align the central axis of third swivel assembly 3130 with the transverse (i.e., X) direction. At block 1310, PS 1200 can actuate third swivel assembly 3130 to align grip space 3156 with the longitudinal (i.e., Y) direction. For the purposes of method 1300, grip space 3156 can be a line segment normal to the inner surfaces of claws 3154 (e.g., the centroids thereof), as shown in FIG. 11. At block 1312, PS 1200 can expand extension 3140 to align grip space 3156 with a longitudinal axis of CCA 100 (e.g., a longitudinal axis extending through the midpoint of rod 410).

FIG. 14 schematically shows the geometry between CCA 100 and robotic arm 3100 after block 1312. Both the midpoint of grip space 3156 and the transverse midpoint of rod 410 are disposed at point 1402. Grip space 3156 perpendicularly intersects the central axis of rod 410.

At block 1314, PS 1200 can simultaneously (a) rotate first swivel assembly 3110, second swivel assembly 3120, (b) drive longitudinal runner assembly 3230, and (c) lengthen extension 3140 to align grip space 3156 with the central axis of rod 410 such that the central axis of rod 410 is normal to opposing grips 3154. PS 1200 can perform block 1314 to pivot about point 1402 such that the midpoint of grip space 3156 continuously intersects point 1402.

FIG. 15, for example, shows an intermediate position of robotic arm 3100 during block 1314. In FIG. 15, the midpoint of grip space 3156 intersects point 1402. FIG. 16 shows a final position of robotic arm 3200 at block 1312. As shown in FIG. 16, grip space 1356 is collinear with the central axis of rod 410. Through the above-discussed pivoting motion, PS 1200 can cause robotic arm 3100 to push away any containers 500 that would otherwise interfere with the decoupling process.

At block 1316, PS 1200 can move first grip 3154a transversely inwards to push rod 410 toward spring 430. For example, PS 1200 can use first grip 3154a to oppose the biasing force of spring 430 until pin 460 reaches point 974 from point 972 in cam 900 (see FIG. 9).

According to some embodiments, cam 900 is absent. PS 1200 can therefore translate and rotate grips 1354 to replicate cam 900. For example, at block 1316, PS 1200 can squeeze rod 410 between grips 1354 and rotate rod 410 by 90 degrees to clear arms 420 of posts 350.

At block 1318, PS 1200 can allow spring 430 to drive rod 410 from point 974 to point 978 on cam 900 and thereby separate CCA 100. At block 1320, PS 1200 can squeeze rod 410 between grips 1354. Block 1320 can occur prior to block 1320 completing (i.e., before rod 410 reaches point 978 on cam 900. At block 1322, PS 1200 can contract or expand extension 3140 such that both transverse bearings 202, 302 are simultaneously clear of rail channels 2402, 2404. At block 1324, PS 1200 can drive vertical runners 3210 vertically downwards to clear container 500 of rail 2400. At block 1326, PS 1200 can retract extension 3140 while container 500 CCA 100 remains squeezed between grips 1354. Robotic arm 3100 can now deposit container 500 in another location.

Referring to FIG. 17, processing system ("PS") 1200 can be configured to perform a method 1700. Method 1700 can be for coupling a container 500 with rail 2400. At block 1702, PS 1200 can squeeze rod 410 between opposing grips 1354. CCA 100 can be at point 978 of FIG. 9 (i.e., in the separated state). At block 1704, PS 1200 can use robotic arm 3100 to position CCA 100 such that the transverse bearings 202, 302 are transversely aligned with rail channels 2402, 2404 (FIG. 5).

At block 1706, PS 1200 can simultaneously drive first grip 3154a inward and second grip 1354b outward to actuate rod 410 from position 978 to position 982 with respect to cam 900 (see FIG. 9). CCA 100 can now be fully coupled with bearings 202, 302, 304 properly positioned in rail channels 2402, 2404, 2406. If cam 900 is absent, then PS 1200 can replicate the motion at block 1706 by rotating rod 910 by 90 degrees, driving rod 410 against spring 430 until arms 420 clear posts 350. After arms 420 clear posts 350, PS 1200 can rotate rod by 90 degrees (e.g., negative 90 degrees) to align arms 420 with posts 350.

At block 1708, PS 1200 can expand grip space 1356, enabling spring 430 to push rod 410 into posts 350 as shown in FIGS. 9A and 9B. At block 1710, PS 1200 can withdraw robotic arm 3100.

We claim:

1. A system for decoupling a container from a rail comprising first and second transverse channels defined therein, the system comprising:
   the container, which comprises: a rod, a spring, a first plate assembly comprising a first transverse bearing disposed in the first transverse rail channel, and a second plate assembly comprising a second transverse bearing disposed in the second transverse rail channel;
   a robotic assembly comprising a robotic arm, the robotic arm comprising opposing grips defining a grip space therebetween;
   a processing system comprising one or more processors configured to, via the robotic assembly:
      align the grip space with the container rod;
      drive the rod against the spring;
      allow the spring to relax and thereby separate the first plate assembly of the container from the second plate assembly of the container;
      position the rod such that the first transverse bearing of the container and the second transverse bearing of the container are withdrawn from the first and second transverse channels of the rail.

2. The system of claim 1 wherein said robotic arm further comprises one or more swivel assemblies.

3. The system of claim 2 wherein said robotic arm is coupled to a robotic beam adapted to change the vertical position of said robotic arm.

4. The system of claim 3 wherein said robotic arm is coupled to said robotic beam via a longitudinal runner assembly configured for longitudinal motion along the robotic beam.

5. The system of claim 4 wherein said robotic beam comprises one or more vertical runner assemblies.

6. The system of claim 2 wherein said robotic arm further comprises a first swivel assembly rotatable about a vertical axis and a second swivel assembly rotatable about a central axis defined by the robotic arm.

7. A system for decoupling a container from a rail comprising first and second transverse channels defined therein, the system comprising:
   the container, which comprises:
      a first plate assembly comprising a first transverse bearing disposed in the first transverse rail channel;
      a second plate assembly disposed proximate said first plate assembly, said second plate assembly comprising a second transverse bearing disposed in the second transverse rail channel;
      a release assembly comprising a rod and a spring; and
      a vessel carried by one or both of said first plate assembly and said second plate assembly;
   a robotic assembly comprising a robotic arm and one or more processors, the processors configured to operate the robotic assembly to:
      manipulate the rod;
      allow the spring to relax and thereby separate the first plate assembly of the container from the second plate assembly of the container;
      position the rod such that the first transverse bearing of the container and the second transverse bearing of the container are withdrawn from the first and second transverse channels of the rail.

8. The system of claim 7 wherein the robotic arm comprises opposing grips defining a grip space therebetween.

9. The system of claim 8 wherein the processors are further configured to operate the robotic assembly to align the grip space with the container rod.

10. The system of claim 9 wherein the processors are further configured to operate the robotic assembly to rotate the rod.

11. The system of claim 9 wherein the processors are further configured to operate the robotic assembly to drive the rod against the spring.

12. The system of claim 7 wherein said first plate assembly comprises a first base and said second plate assembly comprises a second base, and wherein said first base comprises a first retainer and said second base comprises a second retainer, said first and second retainers cooperating to couple said first plate assembly and said second plate assembly.

13. The system of claim 12 wherein one of said first retainer and said second retainer comprises one or more fingers and the other of said first retainer and said second retainer comprises one or more blind holes for receiving corresponding ones of the one or more fingers.

14. The system of claim 7 wherein said rail defines a third transverse channel and wherein one of said first plate assembly and said second plate assembly comprise a vertical bearing disposed in said third transverse channel.

15. A method of decoupling a container from a rail comprising first and second transverse channels defined therein, the system comprising:
   positioning a robotic assembly comprising a robotic arm proximate a container coupled to said rail, said container comprising a vessel carried by one or both of a first plate assembly and a second plate assembly, the first plate assembly comprising a first transverse bearing disposed in the first transverse rail channel, and the second plate assembly comprising a second transverse bearing disposed in the second transverse rail channel, and a release assembly comprising a rod and a spring;
   manipulating said rod with said robotic arm to thereby separate the first plate assembly of the container from the second plate assembly of the container;
   positioning the rod with said robotic arm such that the first transverse bearing of the container and the second transverse bearing of the container are withdrawn from the first and second transverse channels of the rail.

16. The method of claim 15 wherein said robotic arm comprising opposing grips defining a grip space therebetween and wherein said step of manipulating said rod comprises gripping the rod with said opposing grips.

17. The method of claim 15 wherein the step of manipulating said rod comprises driving said rod against said spring.

18. The method of claim 17 wherein the step of manipulating said rod further comprises allowing the spring to relax to thereby separate the first plate assembly of the container from the second plate assembly of the container.

19. The method of claim 15 wherein the step of manipulating said rod comprises rotating said rod.

20. The method of claim 15 wherein the robotic assembly further comprises a robotic beam, said robotic arm coupled to said robotic beam by a longitudinal runner assembly, said step of positioning the robotic assembly further comprising vertically positioning said robotic beam.

\* \* \* \* \*